(12) United States Patent
Huggins et al.

(10) Patent No.: US 7,758,836 B1
(45) Date of Patent: Jul. 20, 2010

(54) SYSTEM AND METHOD FOR REMOVING SULFUR-CONTAINING CONTAMINANTS FROM INDOOR AIR

(76) Inventors: Ronald G. Huggins, 51 Cassidy Cove, Jefferson, GA (US) 30549; Carl M. Sabatello, 5002 Whispering Hollow, Palm Beach Gardens, FL (US) 33418; Paul T. Sabatello, 5558 High Flyer Rd. North, Palm Beach Gardens, FL (US) 33418

(*) Notice: Subject to any disclaimer, the term of this patent is extended or adjusted under 35 U.S.C. 154(b) by 0 days.

(21) Appl. No.: 12/473,205

(22) Filed: May 27, 2009

Related U.S. Application Data

(60) Provisional application No. 61/169,248, filed on Apr. 14, 2009.

(51) Int. Cl.
| | |
|---|---|
| A61L 9/00 | (2006.01) |
| A62B 11/00 | (2006.01) |
| B01D 35/00 | (2006.01) |
| B01D 37/00 | (2006.01) |
| B01D 46/00 | (2006.01) |
| B01D 53/00 | (2006.01) |
| B01J 8/04 | (2006.01) |
| F24F 3/16 | (2006.01) |

(52) U.S. Cl. .............. 423/220; 423/230; 423/232; 423/242.1; 423/244.01; 423/244.02; 423/244.03; 423/244.07; 423/244.08; 422/5; 422/120; 422/122; 422/129; 422/168; 422/169; 422/177; 422/180; 422/187; 96/134; 96/154; 95/135; 95/285

(58) Field of Classification Search ............... 423/220, 423/230, 232, 242.1, 244.01, 244.02, 244.03, 423/244.07, 244.08; 422/5, 120, 122, 129, 422/168, 169, 177, 180, 187; 96/134, 154; 95/135, 285
See application file for complete search history.

(56) References Cited

U.S. PATENT DOCUMENTS

| | | | |
|---|---|---|---|
| 4,215,096 | A | 7/1980 | Shina et al. |
| 4,227,904 | A | 10/1980 | Kasmark, Jr. et al. |
| 4,238,334 | A | 12/1980 | Halbfoster |
| 4,273,751 | A | 6/1981 | Sinha et al. |
| 4,443,354 | A | 4/1984 | Eian |
| 4,517,111 | A | 5/1985 | Dorman et al. |
| 4,553,992 | A | 11/1985 | Boissinot et al. |
| 4,637,408 | A | 1/1987 | Rainer et al. |
| 4,699,681 | A | 10/1987 | Kasmark, Jr. et al. |

(Continued)

*Primary Examiner*—Timothy C Vanoy
(74) *Attorney, Agent, or Firm*—Novak Druce + Quigg; J. Rodman Steele, Jr.; Mark M. Zylka

(57) ABSTRACT

A system and method for removing sulfur-containing contaminants from indoor air includes a panel system having a first layer and a second layer. The first layer can include a base media onto which sodium bicarbonate is attached. The second layer can include a base media onto which activated carbon is attached. Indoor air including sulfur-containing contaminants can contact and pass through the first layer. Sulfuric acid can react with the sodium bicarbonate to produce sodium sulfate, which can, in turn, act as a drying agent for organic sulfur-containing contaminants in the indoor air, such as carbon disulfide and carbonyl sulfide. As a result of such drying, the second layer can more effectively trap and/or bind (adsorb) the organic sulfur-containing contaminants so that these contaminants are removed from the contaminated air. The treated air can be returned to an indoor space of the structure.

24 Claims, 5 Drawing Sheets

U.S. PATENT DOCUMENTS

| | | |
|---|---|---|
| 4,763,674 A | 8/1988 | Lelah |
| 4,767,605 A | 8/1988 | Lindbauer et al. |
| 4,815,092 A | 3/1989 | Chartier |
| 4,855,276 A | 8/1989 | Osborne et al. |
| 4,859,438 A | 8/1989 | Lindbauer et al. |
| 4,943,394 A | 7/1990 | Lammertz et al. |
| 4,963,166 A | 10/1990 | Hoyt et al. |
| 5,059,405 A | 10/1991 | Watson et al. |
| 5,212,131 A | 5/1993 | Belding |
| 5,231,796 A | 8/1993 | Sims |
| 5,278,112 A | 1/1994 | Klatte |
| 5,338,340 A | 8/1994 | Kasmark, Jr. et al. |
| 5,417,743 A | 5/1995 | Dauber |
| 5,500,038 A | 3/1996 | Dauber et al. |
| 5,585,296 A | 12/1996 | Chung et al. |
| 5,942,323 A | 8/1999 | England |
| 6,024,782 A | 2/2000 | Freund et al. |
| 6,302,946 B1 | 10/2001 | Cronia et al. |
| 2002/0106303 A1* | 8/2002 | Stiros et al. ............ 422/5 |
| 2005/0186900 A1 | 8/2005 | Janesky |

* cited by examiner

SYSTEM AND METHOD FOR REMOVING SULFUR-CONTAINING CONTAMINANTS FROM INDOOR AIR

CROSS-REFERENCE TO RELATED APPLICATIONS

This Application claims the benefit of U.S. Provisional Application No. 61/169,248, filed on Apr. 14, 2009.

FIELD OF THE INVENTION

The invention relates in general to indoor air quality and, more particularly, to the removal of toxic or corrosive compounds from air in an indoor environment.

BACKGROUND OF THE INVENTION

Over the course of several years, the United States had experienced rapid growth in the commercial and residential construction market. This construction boom, coupled with several destructive hurricanes that required extensive rebuilding activity, resulted in a dramatic shortage in domestic building materials including drywall. As a result, construction companies turned to foreign sources of drywall. Due to its abundance and inexpensiveness, millions of pounds of Chinese manufactured drywall were imported into the U.S. to alleviate the drywall shortage.

This imported Chinese drywall was made using many different filler materials. One such filler material can be from the mining of calcium sulfate. Another such filler material can be fly ash, which is a byproduct of the industrial burning of high content sulfur coal. One or more volatile sulfur compounds can be retained in the fly ash and, thus, the drywall. The drywall can emit gases (contaminants) which include sulfur-containing contaminants, such as hydrogen sulfide ($H_2S$), carbon disulfide ($CS_2$), and carbonyl sulfide (COS). These contaminants are released into the indoor air of the habitable areas of a building and into the interior of the enclosed wall cavities. These contaminants can irritate an occupant's skin, eyes, sinuses and lungs. Acute and chronic exposure to the contaminants can cause respiratory problems and can affect the nervous system.

From a structural perspective, hydrogen sulfide ($H_2S$) is converted to sulfuric acid ($H_2SO_4$) when it comes into molecular contact with humidity. Sulfuric acid ($H_2SO_4$) is extremely corrosive to metals and construction components and can cause substantial structural damage. In a dwelling, sulfuric acid can corrode copper plumbing, the copper coils of an air conditioning air handler, electrical wiring, cabinet hardware, etc.

Thus, there is a need for a system and method that can minimize such concerns.

SUMMARY OF THE INVENTION

In one respect, embodiments of the invention are directed to a panel system for removing sulfur-containing contaminants from indoor air. The system includes a first layer and a second layer. The first layer has a base media. Sodium bicarbonate is associated with the base media of the first layer. The first layer is configured to allow air to flow through it. Thus, when a gas flow containing sulfuric acid and sulfur-containing contaminants passes through the first layer, the sulfuric acid chemically reacts with the sodium bicarbonate to produce sodium sulfate, water and carbon dioxide. In such case, the sodium sulfate can act as a drying agent for the organic sulfur-containing contaminants by adsorbing at least a portion of the water produced in the chemical reaction.

The second layer has a base media. Activated carbon is associated with the base media of the second layer. The second layer is configured to allow air to flow through it. The second layer is operatively positioned relative to the first layer. The first layer can substantially abut the second layer. The first layer can be spaced from the second layer. The first layer can be attached to the second layer. Alternatively, the first layer and the second layer can be unattached.

When the gas flow exiting the first layer passes through the second layer, at least a portion of the organic sulfur-containing contaminates is adsorbed by the activated carbon. As a result, the level of the sulfur-containing contaminants in the gas flow leaving the panel system is less than the level of the sulfur-containing contaminants in the gas flow entering the panel system.

In another respect, embodiments of the invention concern a system for removing sulfur-containing contaminants from indoor air. The system includes an indoor space that is at least partially defined by a wall made from drywall containing sulfur-containing contaminants. The wall emits gases containing the sulfur-containing contaminants into the indoor space. The wall can be substantially vertical, or it can be substantially horizontal. The wall can form at least a part of a ceiling of the indoor space.

The system also includes a panel system with a first layer and a second layer. The first layer has a base media. Sodium bicarbonate is associated with the base media of first layer. The second layer has a base media. Activated carbon is associated with the base media of the second layer. The panel system is operatively positioned to contact the gases containing the sulfur-containing contaminants.

When a gas flow containing sulfuric acid and sulfur-containing contaminants passes through the first layer, the sulfuric acid chemically reacts with the sodium bicarbonate to produce sodium sulfate, water and carbon dioxide. The sodium sulfate can act as a drying agent for the organic sulfur-containing contaminants by adsorbing at least a portion of the water produced in the chemical reaction. When the gas flow exiting the first layer passes through the second layer, at least a portion of the organic sulfur-containing contaminates is adsorbed by the activated carbon. Thus, the level of the sulfur-containing contaminants in the gas flow leaving the panel system is less than the level of the sulfur-containing contaminants in the gas flow entering the panel system.

The system can further include an air moving device, which can move the air in the indoor space such that the gases containing the sulfur-containing contaminants contact the panel system. The air moving device can be an air conditioning system, a heating system, a HVAC system, a portable air conditioner, a portable heater, a window air conditioner, a fan, a blower, a negative air machine, or an air purifier. In one embodiment, the panel system can be operatively positioned within the air moving device such that gases containing the sulfur-containing contaminants that flow through the air moving device initially encounter the first layer of the panel system and, subsequently, the second layer of the panel system. As a result, sulfur-containing contaminants in the air are reduced.

Another aspect of the invention relates to a system for removing sulfur-containing contaminants from indoor air. The system includes an indoor space that is at least partially formed by a first wall made from drywall containing sulfur-containing contaminants. The system includes a wall cavity that is formed by at least in part by the first wall. The drywall emits gases containing the sulfur-containing contaminants into the wall cavity. A first vent passage is formed in the first wall so as to permit fluid communication between the wall cavity and the indoor space. As a result, the gases containing the sulfur-containing contaminants in the wall cavity can pass into the indoor space.

The system also includes a panel system with a first layer and a second layer. The first layer has a base media. Sodium bicarbonate is associated with the base media of the first layer. The second layer has a base media. Activated carbon is associated with the base media of the second layer. The first and second layers are operatively positioned to contact the gases containing the sulfur-containing contaminants.

When a gas flow containing sulfuric acid and sulfur-containing contaminants passes through the first layer, the sulfuric acid chemically reacts with the sodium bicarbonate to produce sodium sulfate, water and carbon dioxide. The sodium sulfate can act as a drying agent for the organic sulfur-containing contaminants by adsorbing at least a portion of the water produced in the chemical reaction. When the gas flow exiting the first layer passes through the second layer, at least a portion of the organic sulfur-containing contaminates is adsorbed by the activated carbon. Thus, the level of the sulfur-containing contaminants in the gas flow leaving the panel system is less than the level of the sulfur-containing contaminants in the gas flow entering the panel system.

The system can further include an air moving device, which can move the air in the indoor space to facilitate the gases containing the sulfur-containing contaminants coming into contact the panel system. The air moving device can be an air conditioning system, a heating system, a HVAC system, a portable air conditioner, a portable heater, a window air conditioner, a fan, a blower, a negative air machine, or an air purifier. In one embodiment, the panel system can be operatively positioned within the air moving device such that gases containing the sulfur-containing contaminants that flow through the air moving device initially encounter the first layer of the panel system and, subsequently, the second layer of the panel system. As a result, the amount of sulfur-containing contaminants in the air can be reduced.

In one embodiment, the system can further include a second vent passage. The second vent passage can be formed in the first wall so as to permit fluid communication between the wall cavity and the indoor space. Thus, the gases containing the sulfur-containing contaminants in the wall cavity can pass into the indoor space. In one embodiment, the first wall can be substantially vertical. In such case, the first vent passage can be located in an upper region of the first wall, and the second vent passage can be located in a lower region of the first wall.

The second vent passage can be formed in a second wall that partially forms the indoor space. The second vent passage can permit fluid communication between the wall cavity and the indoor space. As a result, the gases containing the sulfur-containing contaminants in the wall cavity can pass into the indoor space.

In still another respect, embodiments of the invention are directed to a system for removing sulfur-containing contaminants from indoor air. The system includes an air moving device having an air inlet and an air outlet. The air moving device can be an air conditioning system, a heating system, a HVAC system, a portable air conditioner, a portable heater, a window air conditioner, a fan, a blower, a negative air machine, or an air purifier.

The system also includes a panel system with a first layer and a second layer. The first layer has a base media; sodium bicarbonate is associated with the first layer. The second layer has a base media; activated carbon is associated with the second layer. The panel system is operatively positioned within the air moving device between the air inlet and the air outlet such that air flowing through the air moving device initially encounters the first layer of the panel system and subsequently the second layer of the panel system.

Thus, when a gas flow containing sulfuric acid and sulfur-containing contaminants passes through the first layer, the sulfuric acid chemically reacts with the sodium bicarbonate to produce sodium sulfate, water and carbon dioxide. The sodium sulfate can act as a drying agent for the organic sulfur-containing contaminants by adsorbing at least a portion of the water produced in the chemical reaction. Thus, when the gas flow exiting the first layer passes through the second layer, at least a portion of the organic sulfur-containing contaminates is adsorbed by the activated carbon. Consequently, the level of the sulfur-containing contaminants in the gas flow leaving the panel system is less than the level of the sulfur-containing contaminants in the gas flow entering the panel system.

In yet another respect, embodiments of the invention are directed to a method for removing sulfur-containing contaminants from indoor air. The method involves providing a panel system with a first layer and a second layer. The first layer has a base media. Sodium bicarbonate is associated with the base media of the first layer. The second layer has a base media. Activated carbon is associated with the base media of the second layer.

In accordance with the method, a gas flow containing sulfuric acid and sulfur-containing contaminants comes into contact with the first layer of the panel system such that the gas flow passes through the first layer and such that the sulfuric acid chemically reacts with the sodium bicarbonate to produce sodium sulfate, water and carbon dioxide. The sodium sulfate adsorbs at least a portion of the water produced in the chemical reaction. Thus, the sodium sulfate can act as a drying agent for the organic sulfur-containing contaminants.

The gas flow subsequently comes into contact with the second layer of the panel system such that the gas flow passes through the second layer and such that at least a portion of the organic sulfur-containing contaminates is adsorbed by the activated carbon. In this way, the level of the sulfur-containing contaminants in the gas flow leaving the panel system is less than the level of the sulfur-containing contaminants in the air flow entering the panel system.

DETAILED DESCRIPTION OF THE INVENTION

Figure 1:
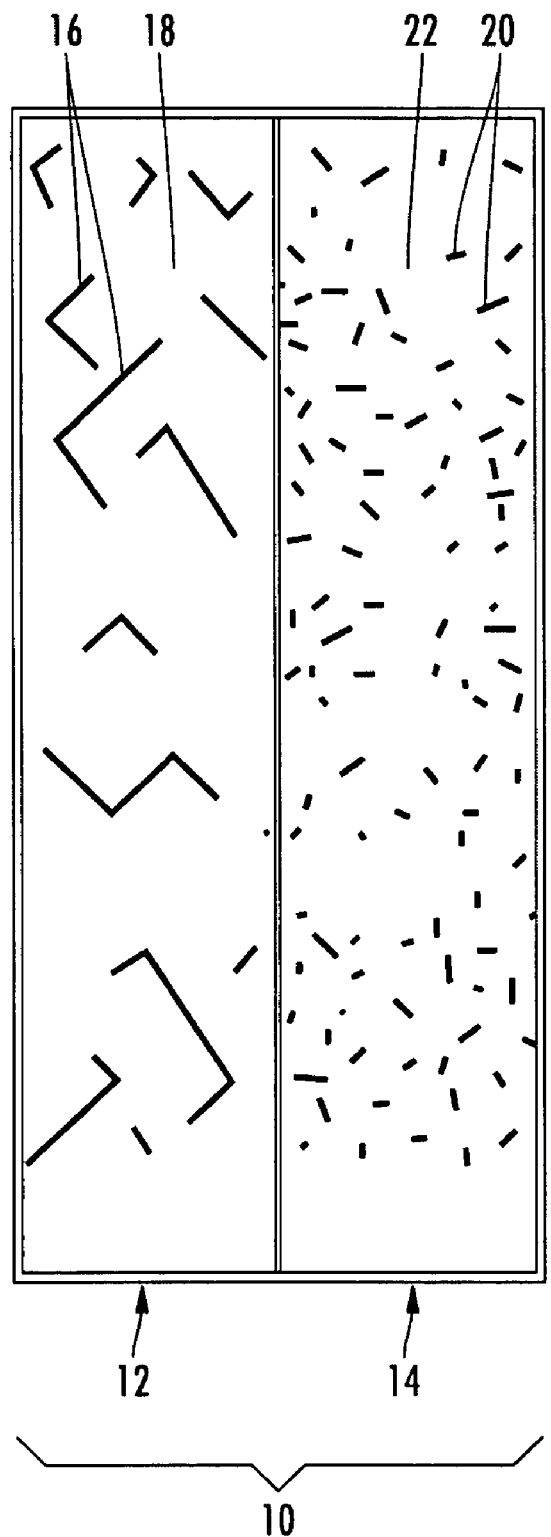
FIG. 1 is a side elevation cross-sectional view of a panel system in accordance with aspects of the invention, showing one example of a two layer system.

Embodiments of the invention are directed to a system and method for removing sulfur-containing contaminants from indoor air. Aspects of the invention will be explained in connection with various possible systems, methods and applications, but the detailed description is intended only as exemplary. Embodiments of the invention are shown in FIGS. 1-5, but the present invention is not limited to the illustrated structure or application.

A system and method according to aspects of the invention can remove sulfur-containing contaminants emitted from drywall containing these contaminants. For convenience, as examples, hydrogen sulfide ($H_2S$), sulfuric acid ($H_2SO_4$), carbonyl sulfide (COS), and carbon disulfide ($CS_2$) will be collectively referred to as "sulfur-containing contaminants." Referring to FIG. 1, systems and methods according to aspects of the invention can include a panel system 10. The panel system 10 can be a removable, replaceable, reactive and interactive substrate (RISS) system.

The panel system 10 can include a plurality of layers. In one embodiment, the panel system 10 can include a first layer 12 and a second layer 14. Each of these layers will be described in detail below. The first layer 12 includes sodium bicarbonate ($NaHCO_3$) 16 and is configured to allow air to flow therethrough. The sodium bicarbonate 16 can be associated with the first layer 12 in any suitable manner. For instance, the first layer 12 can include a base media 18 onto which sodium bicarbonate 16 can be bound, coated, affixed, deposited, applied or otherwise attached. The sodium bicarbonate 16 can be bound to the base media 18 using any suitable binder. Alternatively or in addition, the sodium bicarbonate 16 can be impregnated into the base media 18. The sodium bicarbonate 16 can be provided in any suitable form. It should be noted that other substances can be associated with the first layer 12 as well.

The base media 18 can be a woven or non-woven material comprising a fibrous matrix. Alternatively, the base media 18 can be made of one or more non-fibrous media. Where the base media 18 is a non-woven material, the base material can be made from a process that includes, but is not limited to, spunbond, meltblown, bonded-carded-webs, hydro-entangled webs, and combinations thereof. The fiber can be a synthetic fiber or a natural fiber. Exemplary synthetic fibers include, for example, polyester, fiber glass, steel wool, polypropylene, rayon, acetate, polyamide, nylon, acrylic, elastomers, and combinations thereof. The fibers can be homogeneous or heterogeneous. Exemplary heterogeneous fiber configurations include sheath-core, side-by-side, and islands-in-the-sea configurations.

The fibers can be arranged in any suitable manner. In one embodiment, the arrangement of the fibers forming the fibrous matrix can be random. Alternatively, the fibers forming the matrix can be arranged in any non-random manner, for example, oriented in a machine-direction and randomly oriented in the cross-direction.

Any suitable amount of fiber matrix material can be used in the first layer 12. Likewise, any suitable amount of sodium bicarbonate 16 can be used in the first layer 12. It will be appreciated that the concentration of the sodium bicarbonate 16 can vary according to various criteria, including, for example, the identity of the base media 18, the identity of the other constituents in the fiber, the intended application, the environmental conditions where the fiber will be used, the contact time of the fluid being treated, the surface area of the sodium bicarbonate, and the dimensions of the fiber. While the above description has been directed to a fiber matrix, the base media 18 can be made of one or more non-fiber media.

The second layer 14 can include activated carbon 20 and can be configured to allow air to flow therethrough. The activated carbon 20 can be associated with the second layer 14 in any suitable manner. For instance, the second layer 14 can include a base media 22 onto which the activated carbon 20 can bound, coated, affixed, deposited or otherwise attached. Alternatively or in addition, the activated carbon 20 can be embedded inside the base media 22. The base media 22 can be a woven or non-woven material comprising a fibrous matrix, or it can be made of one or more non-fiber media. The previous discussion concerning the base media 18 of the first layer 12 can equally apply to the base media 22 of the second layer 14.

The activated carbon 20 and the sodium bicarbonate 16 can be provided in any suitable form, including in powered, granular, extruded, impregnated, cloth and/or fiber form, just to name a few possibilities. The activated carbon 20 can be selected based on one or more desired properties, such as apparent density, surface area, and/or particle size distribution.

The first and second layers 12, 14 can have any suitable size and any suitable shape. The first and second layers 12, 14 can be substantially the same size and substantially the same shape. In one embodiment, the first and second layers 12, 14 can be substantially rectangular in conformation. The first and second layers 12, 14 can be sized to be received in an air handling unit, which can be part of an HVAC unit used in residential, commercial or industrial buildings. The first and second layers 12, 14 can be sized and shaped to be received in the place of an air filter in an existing heating or cooling. The size of the first and second layers 12, 14 can also vary according to the identity and quantity of the materials to be bound to the fibrous matrix, the identity and quantity of the other constituents that will be in the fibrous matrix, the intended use of the fibrous matrix, the environmental conditions where the fibrous matrix will be used, and the desired dimensions of the fibrous matrix.

The first layer 12 can have an associated thickness, and the second layer 14 can have an associated thickness. In one embodiment, the thickness of the first layer 12 can be substantially equal to the thickness of the second later. In another embodiment, the thickness of the first layer 12 can be greater than the thickness of the second layer 14. In still another embodiment, the thickness of the first layer 12 can be less than the thickness of the second layer 14. Of course, the thickness of each layer can vary as needed depending on the application.

In one embodiment, the first layer 12 can be attached to the second layer 14. Such attachment can be achieved in any suitable manner. For instance, the first and second layers 12, 14 can be attached by adhesives, mechanical engagement, fasteners, and combinations thereof, just to name a few possibilities. The first and second layers 12, 14 can be at least partially enclosed, such as about their perimeters, by an outer frame. The first layer 12 can substantially abut the second layer 14. That is, at least a portion of the first layer 12 can actually abut the second layer 14, or there may be some slight spacing between the first and second layers 12, 14. Alternatively, the first layer 12 can be spaced from the second layer 14. In such case, the first and second layers 12, 14 can be spaced any suitable distance. For example, the first and second layers 12, 14 can be spaced one or more inches apart, or the first and second layers 12, 14 can be spaced one or more feet apart. In some embodiments, the first and second layers 12, 14 may not be attached to each other at all.

The plurality of layers of the panel system 10 can collectively have an associated Minimum Efficiency Reporting Value (MERV). In one embodiment, the plurality of layers of the panel system 10 can collectively have a MERV of about 14. Such a relatively high MERV number can restrict air flow through the layers, which can ensure sufficient interaction between the gas flow and each of the layers.

While the previous description has been directed to a panel system having two layers, it will be understood that embodiments of the invention are not limited to a panel system having only two layers. Indeed, in some cases, the panel system 10 can have three or more layers. In one embodiment, there can be a third layer (not shown), which can be used for any suitable purpose, including, for example, adjusting the airflow as desired.

A system and method according to aspects of the invention can be used in an indoor space having at least one wall that is made from drywall containing one or more sulfur-containing contaminants. It will also be understood that the term "indoor space" can be any indoor space, area or room within any kind of structure, building or dwelling, including, for example, any type of residential, commercial or industrial structure, building or dwelling. The particular indoor space may or may not be occupiable, livable and/or habitable. The system can also be used in connection with garages or covered lanais.

It will be understood that the term "wall" is intended to include substantially horizontal walls as well as substantially vertical walls and walls at angles therebetween. For instance, a system and method according to aspects of the invention can be used in connection with the ceiling of a multi-floor structure where there is an occupiable floor above or where there is a controlled space above. For instance, the system and method can be used on a ceiling if there is an environmentally controlled attic or a controlled system above. Thus, the term "wall" can include ceilings in at least some instances.

The gases in the indoor space, including air and any sulfur-containing contaminants emitted from the drywall, can come into contact with the first layer 12. In one embodiment, an air moving device or circulation promotion device can be used to facilitate the process. For instance, the air moving device or circulation promotion device can be an air conditioning system, a heating system, a HVAC system, a portable air conditioner, a portable heater, a window air conditioner, a fan, a blower, a negative air machine or an air purifier. The air moving device can be an existing device in the home or commercial facility, such as an air conditioning system or heater system, or it can be a device that is used specifically for the task of remedying the drywall issues, such as a negative air machine or fan.

Figure 2:
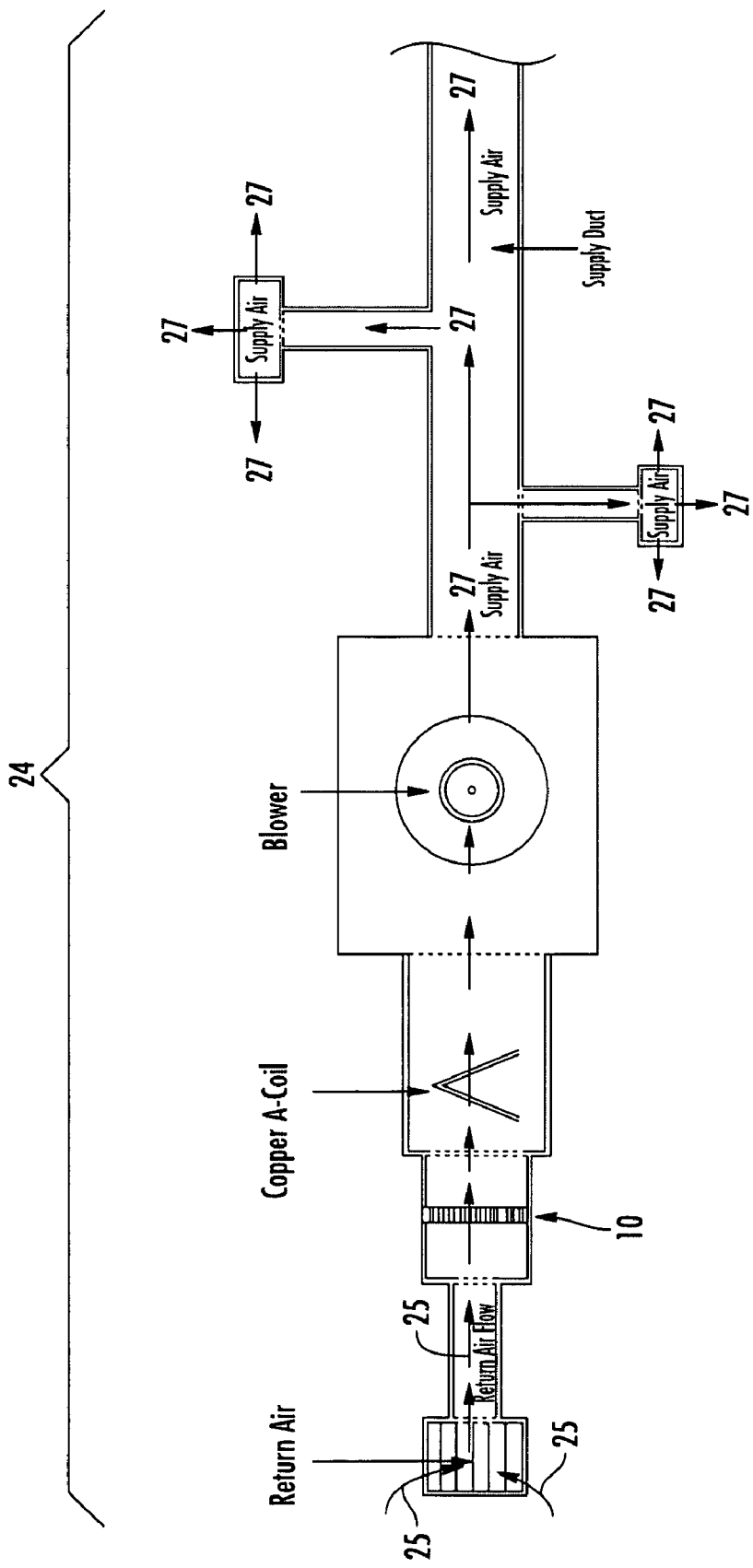
FIG. 2 is a view of a HVAC system equipped with a panel system in accordance with aspects of the invention.

For illustration purposes, the invention will be described in connection with an existing HVAC system 24 within a home or commercial facility, as shown in FIG. 2. However, it will be understood that aspects of the invention are not limited to this particular application or the particular HVAC system shown. The HVAC system 24 can operate, if necessary, 24 hours per day for a continuous circulation of the indoor air. A panel system 10 in accordance with aspects of the invention can be installed in place of the return air filter on the intake side of the HVAC system 24. The air within the indoor environment of the indoor space can pass through the panel system 10 during HVAC operation.

Figure 3:
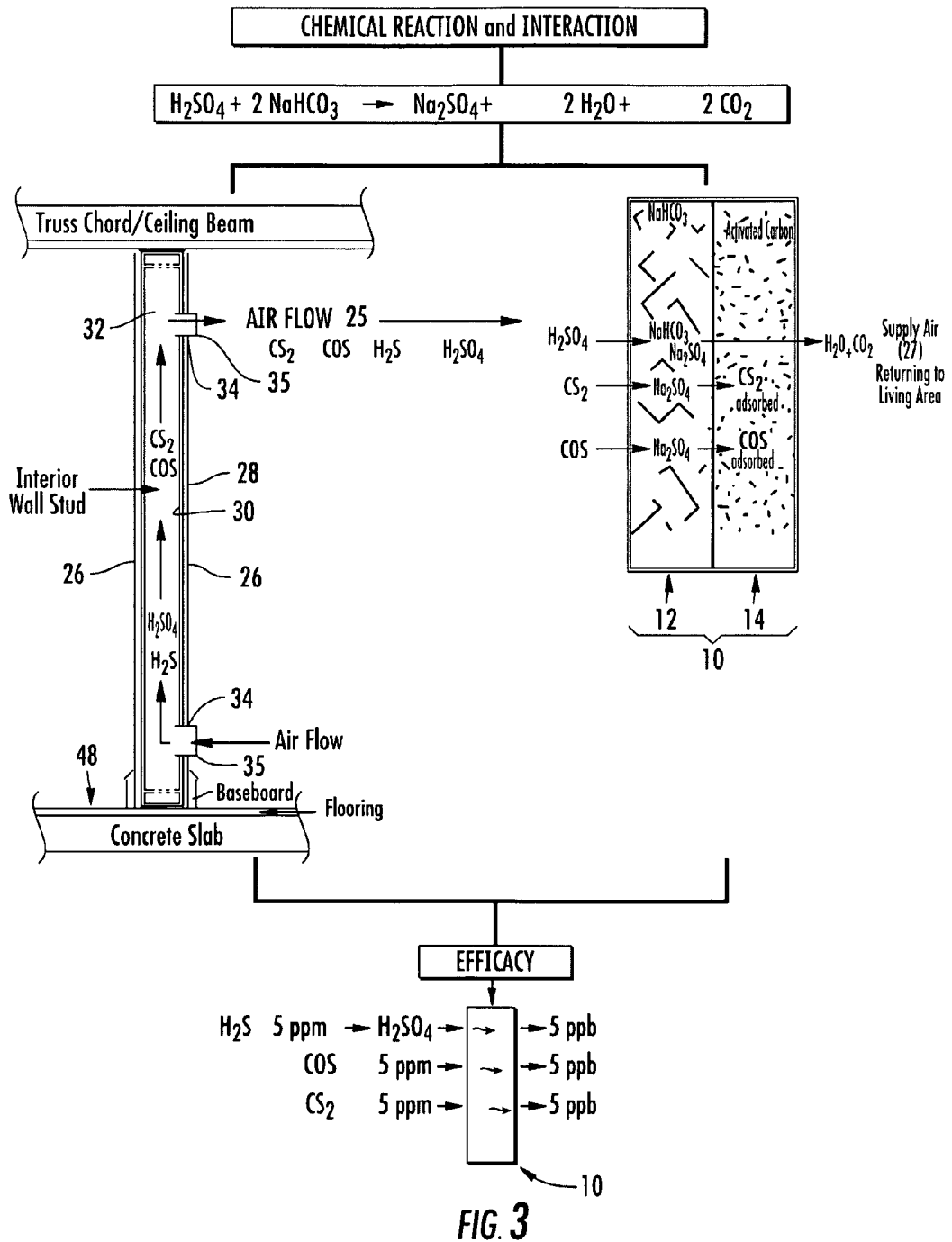
FIG. 3 is a view of the operation of a system and method for removing sulfur-containing contaminants from indoor air and within the wall cavity in accordance with aspects of the invention, and showing the potential efficacy results thereof.

As noted above, the contaminated air including the sulfur-containing contaminants will initially contact the first layer 12 of the system according to aspects of the invention. The contaminated air 25 can pass through the first layer 12 of the panel system 10, as shown in FIG. 3. Sulfuric acid ($H_2SO_4$) in the indoor air can chemically react with the sodium bicarbonate ($NaHCO_3$) 16 to produce sodium sulfate ($Na_2SO_4$), water ($H_2O$) and carbon dioxide ($CO_2$). The sodium sulfate can, in turn, act as a drying agent for the organic sulfur-containing contaminants in the indoor air, such as carbon disulfide ($CS_2$), and carbonyl sulfide (COS), by adsorbing at least the water produced in the reaction. Such water may appear in the form of moisture.

Thus, as the contaminated air 25 exits the first layer 12, the carbon disulfide ($CS_2$), and carbonyl sulfide (COS) contaminants are relatively dry. As a result, the second layer 14 of the system according to aspects of the invention can more effectively trap and/or bind (adsorb) the carbon disulfide ($CS_2$) and carbonyl sulfide (COS) to the surface of the activated carbon, so that these contaminants will be removed from the contaminated air 25. Because the water has been adsorbed by the first layer 12, the activated carbon of the second layer 14 is not overly burdened by the water, leaving it free to adsorb the organic sulfur-containing contaminants in the air (i.e. COS and $CS_2$).

The treated air 27 can be returned to the indoor space of the structure, building or dwelling. Periodically, the first and second layers 12, 14 of the panel system 10 can be removed and discarded, thereby disposing of the contaminants. Based upon amounts of contaminants, the panel system 10 can be removed and replaced as necessary. The continued circulation of the indoor air and removal of the sulfur-containing contaminants can continue until the level of such contaminants in the air has been reduced to a sufficient level, preferably at a level that is below detection limits.

The panel system 10 according to aspects of the invention can significantly reduce the amount of hydrogen sulfide ($H_2S$), carbon disulfide ($CS_2$) and carbonyl sulfide (COS) and other sulfur containing compounds in the contaminated air. In one embodiment, the panel system 10 can reduce the amount of each of hydrogen sulfide ($H_2S$), carbon disulfide ($CS_2$) and carbonyl sulfide (COS) to less than about 0.1 parts per million. In another embodiment, the panel system 10 can reduce the amount of each of hydrogen sulfide ($H_2S$), carbon disulfide ($CS_2$) and carbonyl sulfide (COS) to less than about 5 parts per billion. The amount of hydrogen sulfide ($H_2S$), carbon disulfide ($CS_2$) and/or carbonyl sulfide (COS) can be reduced to an amount that is below detection limits. Alternatively, the panel system 10 can be effective to reduce the levels of hydrogen sulfide ($H_2S$), carbon disulfide ($CS_2$) and carbonyl sulfide (COS) in the contaminated air 25 passing though the panel system 10 by at least about 80 percent and, more particularly, by at least about 90 percent and, still more particularly, by at least about 98 percent.

A system and method according to aspects of the invention can remove a sufficient amount of sulfur-containing contaminants from indoor air to make it safe for human habitation and minimize corrosion. It should be noted that the elimination of odors produced by sulfur-containing contaminants is not necessarily an indication of whether such contaminants are present in an amount that is safe for human exposure. A level of sulfur-containing contaminants that is not perceptible by the sense of smell may nonetheless still be at a harmful level for human exposure and may still result in corrosion.

The above described process may be sufficient to remove the sulfur-containing contaminants emanating from an inwardly facing surface 28 of drywall 26, that is, the surface that is exposed to an indoor space of the building. However, this may only treat a portion of the problem because the drywall 26 is also off-gassing sulfur-containing contaminants on its opposite side 30, which can face a wall cavity 32. These sulfur-containing contaminants would otherwise remain trapped in the wall cavity 32, potentially corroding susceptible plumbing, electrical and structural components.

Figure 4:
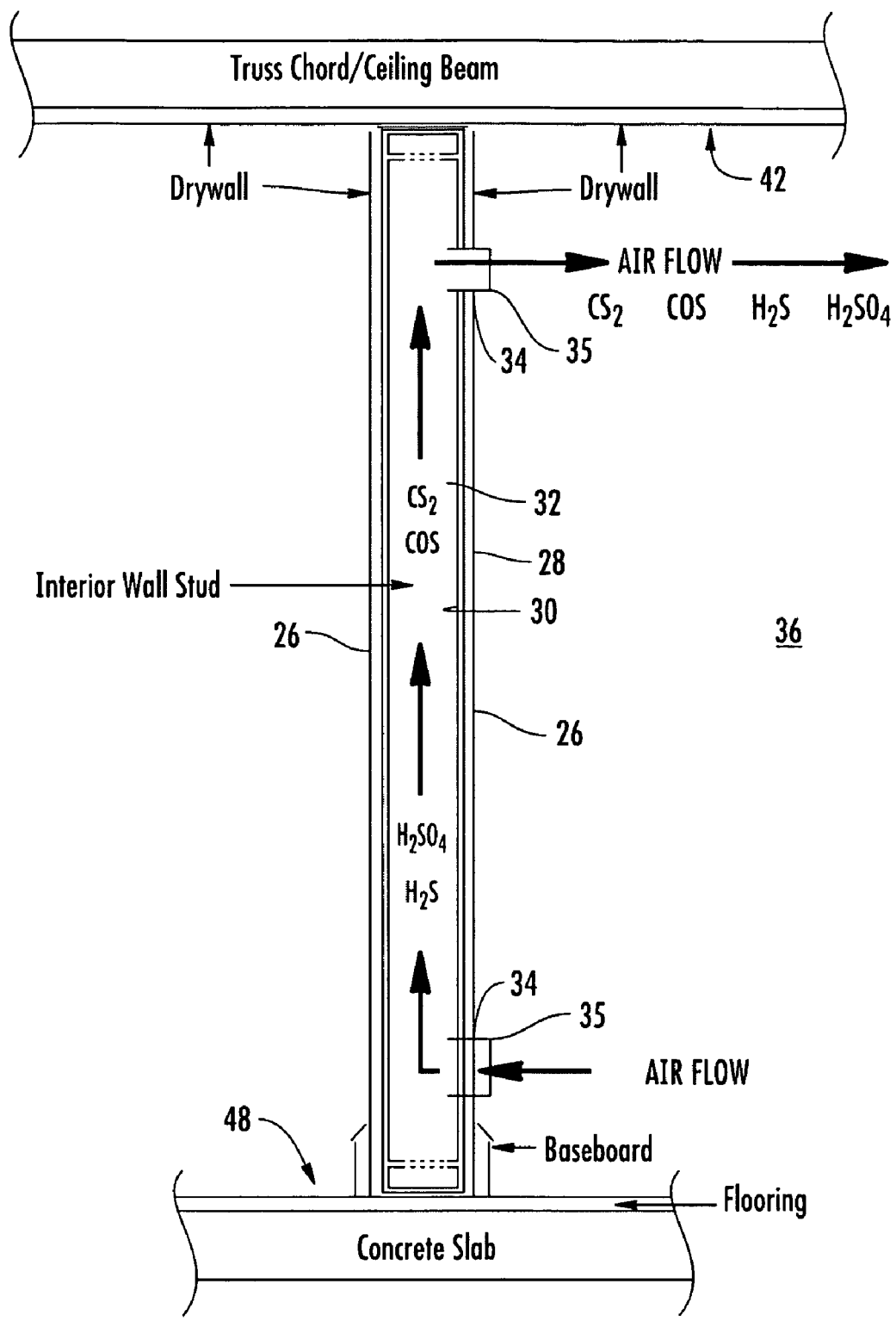
FIG. 4 is a side elevation cross-sectional view of a wall cavity ventilation detail in accordance with aspects of the invention.

Thus, alternatively or in addition to the above, the system and method according to aspects of the invention can be applied to remove the sulfur-containing contaminants within one or more wall cavities 32. To that end, a plurality of wall vent passages 34 can be formed in one or more of the drywall panels defining the wall cavity 32, as shown in FIG. 4. Such vent passages 34 can be formed in any suitable manner, such as by cutting out a portion of the drywall 26. Each vent passage 34 can permit fluid communication between the wall cavity 32 and the indoor space 36, thereby allowing contaminated air from within the wall cavity 32 to be blended and circulated with the air from within the indoor environment of the indoor space 36 and, ultimately, to encounter and react with the panel system 10 according to aspects of the invention. FIG. 4 shows the air flow in the wall cavity 32 as being in a generally vertically upward direction, circulating from a lower region to an upper region. However, embodiments of the invention are not limited to any particular flow direction. Any suitable direction of air flow can be used, including, for instance, air flow in a generally vertically downward direction and/or air flow in a substantially horizontal direction. As a result, the sulfur-containing contaminants trapped in the wall cavity can be removed from the indoor air.

The air in the wall cavity 32 can be allowed to passively circulate out of the wall cavity 32 and into the indoor space 36, such as by the natural rising of hot air. Alternatively, the air in the wall cavity 32 can be forced out of the wall cavity 32 by operatively connecting one or more air moving devices, such as any of those discussed above, in direct or indirect fluid communication with the cavity. For instance, during the continuous operation of the HVAC system 24, the air once trapped within the wall cavity 32 can be drawn out by the return air suction side of the HVAC system 24 and into contact with the panel system 10.

The wall vent passages 34 can remain, as cut, through the drywall 26. Alternatively, a vent structure, such as a modular pre-molded air vent 35, can be associated with the vent passage 34 to direct air flow out of the cavity 32 and/or for aesthetic purposes. For instance, the air vent 35 can be placed in the vent passage 34.

The wall vent passages 34 can have any suitable size and shape. In some instances, aesthetic considerations can dictate the size and shape of the wall vent passages 34. The wall vent passages 34 can all be substantially identical in terms of their size and shape. Alternatively, at least one of the wall vent passages 34 can be different from the other wall vent passages 34 in one or more respects, such as size and shape.

The indoor space and the wall cavity can be in fluid communication through the wall vent passages. The wall vent passages can be free from any direct connection to a conduit. In particular, the wall vent passages can be free from any direct connection to a conduit connection to an air circulation system. Alternatively, there can be a direct connection between at least one of the wall vent passages and a conduit in fluid communication with an air moving device or circulation promoting device.

The wall vents passages 34 can be distributed in any suitable manner. In one embodiment, a plurality of wall vent passages 34 can be provided on one or more of the vertical walls defining the cavity 32. There can be at least two wall vent passages 34 in fluid communication with the same internal cavity 32. The wall vent passages 34 can be equally spaced along the drywall 26.

Figure 5:
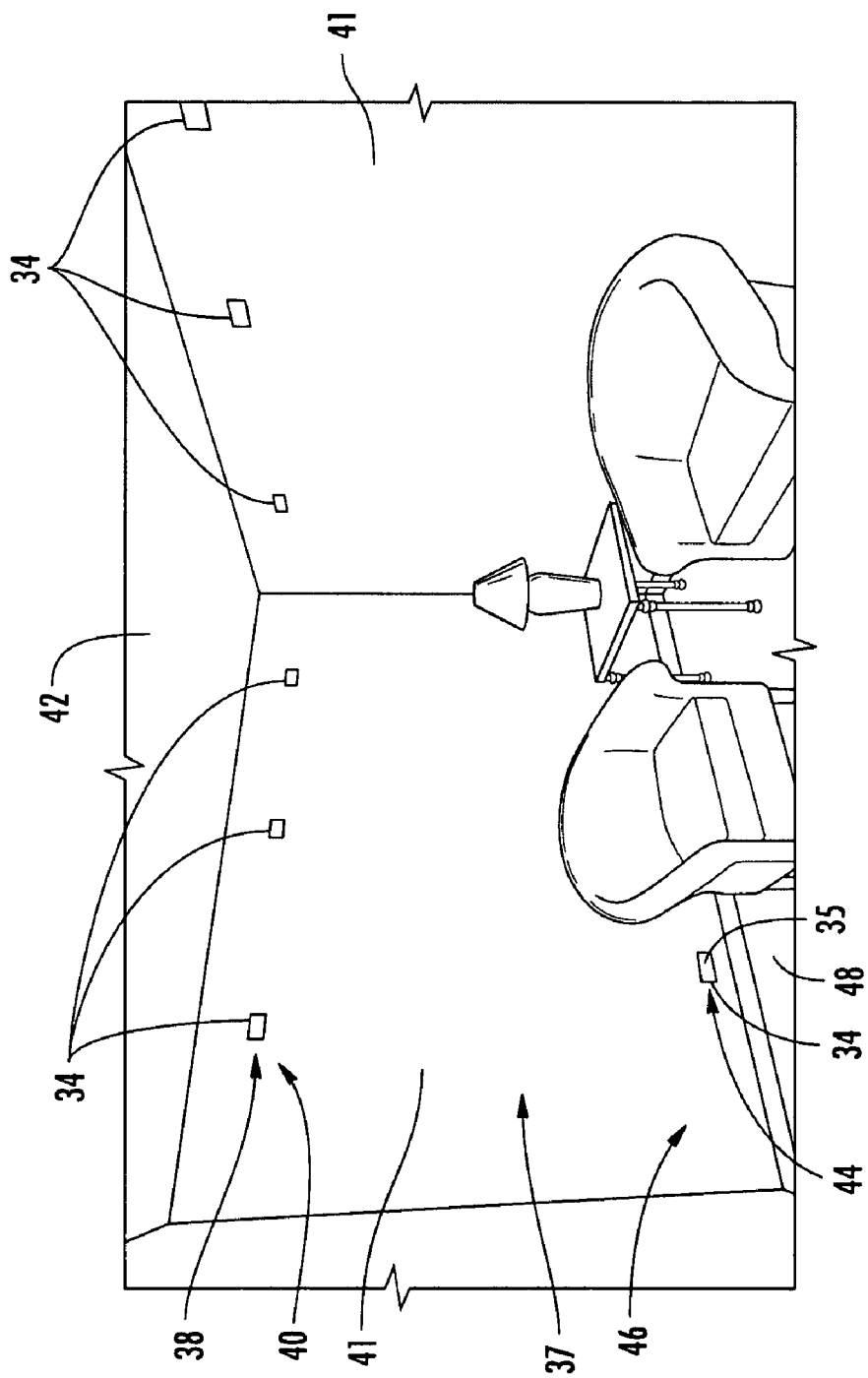
FIG. 5 is a perspective view of an indoor space having a plurality of wall vents in accordance with aspects of the invention.

One possible arrangement of the wall vent passages 34 in an indoor space 37 is shown in FIG. 5. A first plurality of wall vent passages 38 can be distributed along an upper region 40 of a vertical wall 41. The upper region 40 can be from about 6 inches to about 12 inches from the finished ceiling 42 of the indoor space 37. The first plurality of wall vent passages 38 can be aligned in a substantially horizontal row. A second plurality of wall vent passages 44 (only one vent passage 34 being shown) can be distributed along a lower region 46 of the vertical wall 41. The lower region 46 can be from about 6 inches to about 12 inches from the floor 48 of the indoor space 37. The second plurality of wall vent passages 44 can be aligned in a substantially horizontal row. In such case, each of the first plurality of wall vent passages 38 can be substantially vertically aligned with a respective one of the second plurality of wall vent passages 44. Alternatively, one or more of the first plurality of wall vent passages 38 can be offset from a respective one of the second plurality of wall vent passages 44. In one embodiment, there can be a third plurality of wall vent passages (not shown) distributed along a middle region of the vertical wall. In another possible arrangement, a wall vent passage to the wall cavity can be formed in at least one of an upper wall defining the cavity, such as the ceiling, and a lower wall defining the cavity, such as the floor.

A system and method according to aspects of the invention can reduce the airborne levels of the sulfur-containing contaminants to a level at or below detection limits, which can help to minimize, if not eliminate, the health risks associated with exposure to these contaminants. Further, it will be appreciated that a system and method in accordance with aspects of the invention can offer a viable lower cost remedy to the problem of Chinese drywall containing sulfur-containing contaminants compared to the cost of removing and replacing the existing drywall and any in-wall components affected by the sulfur-containing contaminants.

The foregoing description is provided in the context of some of the systems and methods for removing sulfur-containing contaminants from indoor air according to aspects of the invention. While the above description is made in the context of the drywall, it will be understood that the system according to aspects of the invention can be readily applied to other construction materials that may include sulfur-containing contaminants, such as ceiling tile panels and/or flooring materials. Thus, it will of course be understood that the invention is not limited to the specific details described herein, which are given by way of example only, and that various modifications and alterations are possible within the scope of the invention.

What is claimed is:

1. A panel system for removing sulfur-containing contaminants from indoor air comprising:
    a first layer having a base media and sodium bicarbonate associated with the base media, the first layer being configured to allow air to flow therethrough, whereby, when a gas flow including sulfuric acid and sulfur-containing contaminants passes through the first layer, the sulfuric acid chemically reacts with the sodium bicarbonate to produce sodium sulfate, water and carbon dioxide, whereby the sodium sulfate acts as a drying agent for the organic sulfur-containing contaminants by adsorbing at least a portion of the water produced in the chemical reaction; and
    a second layer having a base media and activated carbon associated with the base media, the second layer being configured to allow air to flow therethrough, the second layer being operatively positioned relative to the first layer, whereby, when the gas flow exiting the first layer passes through the second layer, at least a portion of the organic sulfur-containing contaminates is adsorbed by the activated carbon, whereby the level of the sulfur-containing contaminants in the gas flow leaving the panel system is less than the level of the sulfur-containing contaminants in the gas flow entering the panel system.

2. The panel system of claim 1 wherein the first layer is attached to the second layer.

3. The panel system of claim 1 wherein the first layer is not attached to the second layer.

4. The panel system of claim 1 wherein the first layer substantially abuts the second layer.

5. The panel system of claim 1 wherein the first layer is spaced from the second layer.

6. A system for removing sulfur-containing contaminants from indoor air comprising:
   an indoor space being defined at least partially by a wall made from drywall including sulfur-containing contaminants, wherein the wall emits gases containing the sulfur-containing contaminants into the indoor space; and
   a panel system with a first layer and a second layer, the first layer having a base media and sodium bicarbonate associated therewith, the second layer having a base media and activated carbon associated therewith, the panel system being operatively positioned to contact the gases containing the sulfur-containing contaminants,
   whereby, when a gas flow including sulfuric acid and sulfur-containing contaminants passes through the first layer, the sulfuric acid chemically reacts with the sodium bicarbonate to produce sodium sulfate, water and carbon dioxide, whereby the sodium sulfate acts as a drying agent for the organic sulfur-containing contaminants by adsorbing at least a portion of the water produced in the chemical reaction; and whereby, when the gas flow exiting the first layer passes through the second layer, at least a portion of the organic sulfur-containing contaminates is adsorbed by the activated carbon, whereby the level of the sulfur-containing contaminants in the gas flow leaving the panel system is less than the level of the sulfur-containing contaminants in the gas flow entering the panel system.

7. The system of claim 6 wherein the wall is substantially vertical.

8. The system of claim 6 wherein the wall is substantially horizontal.

9. The system of claim 6 wherein the wall forms at least a part of a ceiling of the indoor space.

10. The system of claim 6 further including an air moving device, whereby the air moving moves the air in the indoor space such that the gases containing the sulfur-containing contaminants contact the panel system.

11. The system of claim 10 wherein the air moving device is one of an air conditioning system, a heating system, a HVAC system, a portable air conditioner, a portable heater, a window air conditioner, a fan, a blower, a negative air machine, or an air purifier.

12. The system of claim 10 wherein the panel system is operatively positioned within the air moving device such that gases containing the sulfur-containing contaminants that flow through the air moving device initially encounters the first layer of the panel system and subsequently the second layer of the panel system, whereby sulfur-containing contaminants in the air are reduced.

13. A system for removing sulfur-containing contaminants from indoor air comprising:
   an indoor space being at least partially formed by a first wall made from drywall including sulfur-containing contaminants;
   a wall cavity being formed by at least in part by the first wall, wherein the drywall emits gases containing the sulfur-containing contaminants into the wall cavity;
   a first vent passage formed in the first wall so as to permit fluid communication between the wall cavity and the indoor space, whereby the gases containing the sulfur-containing contaminants in the wall cavity pass into the indoor space; and
   a panel system with a first layer and a second layer, the first layer having a base media and sodium bicarbonate associated therewith, the second layer having a base media and activated carbon associated therewith, the first and second layers being operatively positioned to contact the gases containing the sulfur-containing contaminants,
   whereby, when a gas flow including sulfuric acid and sulfur-containing contaminants passes through the first layer, the sulfuric acid chemically reacts with the sodium bicarbonate to produce sodium sulfate, water and carbon dioxide, whereby the sodium sulfate acts as a drying agent for the organic sulfur-containing contaminants by adsorbing at least a portion of the water produced in the chemical reaction; and whereby, when the gas flow exiting the first layer passes through the second layer, at least a portion of the organic sulfur-containing contaminates is adsorbed by the activated carbon, whereby the level of the sulfur-containing contaminants in the gas flow leaving the panel system is less than the level of the sulfur-containing contaminants in the gas flow entering the panel system.

14. The system of claim 13 further including an air moving device, whereby the air moving moves the air in the indoor space such that the gases containing the sulfur-containing contaminants contact the panel system.

15. The system of claim 14 wherein the air moving device is one of an air conditioning system, a heating system, a HVAC system, a portable air conditioner, a portable heater, a window air conditioner, a fan, a blower, a negative air machine, or an air purifier.

16. The system of claim 14 wherein the panel system is operatively positioned within the air moving device such that gases containing the sulfur-containing contaminants that flow through the air moving device initially encounters the first layer of the panel system and subsequently the second layer of the panel system, whereby sulfur-containing contaminants in the air are reduced.

17. The system of claim 13 further including a second vent passage.

18. The system of claim 17 wherein the second vent passage is formed in the first wall so as to permit fluid communication between the wall cavity and the indoor space, whereby the gases containing the sulfur-containing contaminants in the wall cavity pass into the indoor space.

19. The system of claim 18 wherein the first wall is substantially vertical, wherein the first vent passage is located in an upper region of the first wall and the second vent passage is located in a lower region of the first wall.

20. The system of claim 17 wherein the second vent passage is formed in a second wall that partially forms the indoor space.

21. The system of claim 20 wherein the second vent passage permits fluid communication between the wall cavity and the indoor space, whereby the gases containing the sulfur-containing contaminants in the wall cavity pass into the indoor space.

22. A system for removing sulfur-containing contaminants from indoor air comprising:
   an air moving device having an air inlet and an air outlet; and
   a panel system with a first layer and a second layer, the first layer having a base media and sodium bicarbonate associated therewith, the second layer having a base media and activated carbon associated therewith, the panel system being operatively positioned within the air moving device between the air inlet and the air outlet such that air flowing through the air moving device initially encounters the first layer of the panel system and subsequently the second layer of the panel system, whereby, when a gas flow including sulfuric acid and sulfur-containing contaminants passes through the first layer, the sulfuric acid chemically reacts with the sodium bicarbonate to produce sodium sulfate, water and carbon dioxide, whereby the sodium sulfate acts as a drying agent for the organic sulfur-containing contaminants by adsorbing at least a portion of the water produced in the chemical reaction; and whereby, when the gas flow exiting the first layer passes through the second layer, at least a portion of the organic sulfur-containing contaminates is adsorbed by the activated carbon, whereby the level of the sulfur-containing contaminants in the gas flow leaving the panel system is less than the level of the sulfur-containing contaminants in the gas flow entering the panel system.

23. The system of claim 22 wherein the air moving device is one of an air conditioning system, a heating system, a HVAC system, a portable air conditioner, a portable heater, a window air conditioner, a fan, a blower, a negative air machine, and an air purifier.

24. A method for removing sulfur-containing contaminants from indoor air comprising:

provideing a panel system with a first layer and a second layer, the first layer having a base media and sodium bicarbonate associated therewith, the second layer having a base media and activated carbon associated therewith;

a gas flow including sulfuric acid and sulfur-containing contaminants coming into contact with the first layer of the panel system such that the gas flow passes therethrough and such that the sulfuric acid chemically reacts with the sodium bicarbonate to produce sodium sulfate, water and carbon dioxide, wherein the sodium sulfate adsorbs at least a portion of the water produced in the chemical reaction, whereby the sodium sulfate acting as a drying agent for the organic sulfur-containing contaminants;

the gas flow subsequently coming into contact with the second layer of the panel system such that the gas flow passes therethrough and such that at least a portion of the organic sulfur-containing contaminates is adsorbed by the activated carbon, whereby the level of the sulfur-containing contaminants in the gas flow leaving the panel system is less than the level of the sulfur-containing contaminants in the air flow entering the panel system.

\* \* \* \* \*